(12) United States Patent
Abraham et al.

(10) Patent No.: US 9,820,131 B2
(45) Date of Patent: Nov. 14, 2017

(54) SYSTEMS AND METHODS FOR FORMATTING FRAMES IN NEIGHBORHOOD AWARE NETWORKS

(71) Applicant: QUALCOMM, Incorporated, San Diego, CA (US)

(72) Inventors: Santosh Paul Abraham, San Diego, CA (US); George Cherian, San Diego, CA (US); Alireza Raissinia, Monte Sereno, CA (US); Ashish Kumar Shukla, Sunnyvale, CA (US); Guido Robert Frederiks, Aptos, CA (US); Simone Merlin, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 110 days.

(21) Appl. No.: 14/105,114

(22) Filed: Dec. 12, 2013

(65) Prior Publication Data
US 2014/0198725 A1   Jul. 17, 2014

Related U.S. Application Data

(60) Provisional application No. 61/751,712, filed on Jan. 11, 2013, provisional application No. 61/757,451, (Continued)

(51) Int. Cl.
*H04J 3/06* (2006.01)
*H04W 8/00* (2009.01)
(Continued)

(52) U.S. Cl.
CPC ............ *H04W 8/005* (2013.01); *H04L 67/16* (2013.01); *H04W 48/18* (2013.01); *H04W 76/00* (2013.01);
(Continued)

(58) Field of Classification Search
None
See application file for complete search history.

(56) References Cited

U.S. PATENT DOCUMENTS 6,532,368 B1  3/2003 Hild et al.
8,203,984 B2 * 6/2012 Gong ................... G06F 1/3209
370/311

(Continued)

FOREIGN PATENT DOCUMENTS

TW      200908644 A    2/2009
TW      201014396 A    4/2010
WO   WO-2011159093 A2  12/2011

OTHER PUBLICATIONS

Gupta V., et al., "Information Embedding in IEEE 802.11 Beacon Frame," National conference on communication technologies & its impact on next generation computing CTNGC, Proceedings published by International Journal of computer applications, Nov. 6, 2012, pp. 12-16, XP055119181.

(Continued)

*Primary Examiner* — Kwang B Yao
*Assistant Examiner* — Juvena Loo
(74) *Attorney, Agent, or Firm* — Knobbe, Martens, Olson & Bear, LLP

(57) ABSTRACT

Systems and methods for formatting frames in neighborhood aware networks are described herein. One aspect of the subject matter described in the disclosure provides a method of communicating in a wireless neighborhood aware network (NAN). The method includes determining a discovery period. The method further includes generating a discovery window information element indicating a start time of a discovery window. The method further includes generating a NAN beacon or other sync frame comprising the discovery period and the discovery window information element. The (Continued)

method further includes transmitting, at a wireless device, the NAN beacon or other sync frame during the discovery window.

32 Claims, 10 Drawing Sheets

Related U.S. Application Data filed on Jan. 28, 2013, provisional application No. 61/762,249, filed on Feb. 7, 2013, provisional application No. 61/799,651, filed on Mar. 15, 2013, provisional application No. 61/815,190, filed on Apr. 23, 2013.

(51) Int. Cl.
| | |
|---|---|
| H04W 76/02 | (2009.01) |
| H04L 29/08 | (2006.01) |
| H04W 84/18 | (2009.01) |
| H04W 48/18 | (2009.01) |
| H04W 76/00 | (2009.01) |
| H04W 4/00 | (2009.01) |

(52) U.S. Cl.
CPC ........... *H04W 76/02* (2013.01); *H04W 84/18* (2013.01); *H04W 4/005* (2013.01); *H04W 4/008* (2013.01)

(56) References Cited

U.S. PATENT DOCUMENTS

| | | | |
|---|---|---|---|
| 2005/0025080 A1 | 2/2005 | Liu | |
| 2006/0239265 A1 | 10/2006 | Son et al. | |
| 2006/0285528 A1* | 12/2006 | Gao | H04W 52/0229 370/338 |
| 2007/0165589 A1* | 7/2007 | Sakoda | 370/345 |
| 2007/0286136 A1* | 12/2007 | Rittle | H04W 8/005 370/338 |
| 2007/0296136 A1 | 12/2007 | Fukusaka et al. | |
| 2008/0031208 A1 | 2/2008 | Abhishek et al. | |
| 2008/0031210 A1 | 2/2008 | Abhishek et al. | |
| 2008/0045210 A1* | 2/2008 | Kaaja | H04W 52/0219 455/434 |
| 2009/0103501 A1* | 4/2009 | Farrag et al. | 370/337 |
| 2009/0327292 A1 | 12/2009 | Janssen et al. | |
| 2010/0170511 A1* | 7/2010 | Payne et al. | 128/204.14 |
| 2010/0172275 A1* | 7/2010 | Wu et al. | 370/311 |
| 2010/0214967 A1 | 8/2010 | Moelard et al. | |
| 2010/0315954 A1* | 12/2010 | Singh et al. | 370/241 |
| 2011/0019551 A1* | 1/2011 | Adams et al. | 370/235 |
| 2011/0103264 A1 | 5/2011 | Wentink | |
| 2011/0142014 A1* | 6/2011 | Banerjee | H04L 63/0869 370/338 |
| 2011/0153773 A1 | 6/2011 | Vandwalle et al. | |
| 2011/0170465 A1* | 7/2011 | Tavildar et al. | 370/311 |
| 2011/0170511 A1* | 7/2011 | Chen | H04W 72/02 370/329 |
| 2011/0310791 A1* | 12/2011 | Prakash et al. | 370/315 |
| 2012/0243524 A1 | 9/2012 | Verma et al. | |
| 2013/0044640 A1* | 2/2013 | Yen et al. | 370/255 |
| 2013/0132501 A1 | 5/2013 | Vandwalle et al. | |
| 2013/0177002 A1* | 7/2013 | Sun et al. | 370/338 |
| 2013/0185373 A1* | 7/2013 | Vandwalle | H04W 56/0015 709/208 |
| 2013/0205012 A1 | 8/2013 | Lee et al. | |
| 2013/0227152 A1 | 8/2013 | Lee et al. | |
| 2013/0322297 A1* | 12/2013 | Dominguez | 370/255 |
| 2014/0105131 A1* | 4/2014 | Chu et al. | 370/329 |
| 2014/0112194 A1* | 4/2014 | Novlan et al. | 370/254 |
| 2014/0148099 A1* | 5/2014 | Reunamaki | H04W 52/0209 455/41.2 |
| 2014/0198724 A1 | 7/2014 | Abraham et al. | |

OTHER PUBLICATIONS

International Search Report and Written Opinion—PCT/US2013/075854—ISA/EPO—dated Jun. 3, 2014.
Ververidis C.N, et al., "Service discovery for mobile Ad Hoc networks, a survey of issues and techniques", IEEE Communications Surveys, IEEE, New York, NY, US, vol. 10, No. 3, Jul. 1, 2008 (Jul. 1, 2008), pp. 30-45, XP011234560, ISSN, 1553-877X.
Taiwan Search Report—TW103100684—TIPO—Apr. 16, 2015.
Taiwan Search Report—TW103100684—TIPO—dated Apr. 14, 2016.
"Wi-Fi Peer-to-Peer (P2P) Specification v1.2", Wi-Fi Peer-To-Peer (P2P) Specification V1.2, Wi-Fi Alliance, US, vol. V1.2, 2010, pp. 1-160, XP008165048, Retrieved from the Internet: URL:https://www.wi-fi.org/knowledge-center/published-specifications.

\* cited by examiner

SYSTEMS AND METHODS FOR FORMATTING FRAMES IN NEIGHBORHOOD AWARE NETWORKS

CROSS-REFERENCE TO RELATED APPLICATIONS

This application claims the benefit of U.S. Provisional Patent Application No. 61/751,712, U.S. Provisional Patent Application No. 61/757,451, U.S. Provisional Patent Application No. 61/762,249, U.S. Provisional Patent Application No. 61/799,651, and U.S. Provisional Patent Application No. 61/815,190, which are all entitled "SYSTEMS AND METHODS FOR FORMATTING FRAMES IN NEIGHBORHOOD AWARE NETWORKS," and were filed on: Jan. 11, 2013; Jan. 28, 2013; Feb. 7, 2013; Mar. 15, 2013; and Apr. 23, 2013, respectively, the entirety of which are incorporated herein by reference.

TECHNICAL FIELD

The present application relates generally to wireless communications, and more specifically to a system and method for formatting frames in neighborhood aware networks.

BACKGROUND

In many telecommunication systems, communications networks are used to exchange messages among several interacting spatially-separated devices. Networks may be classified according to geographic scope, which may be, for example, a metropolitan area, a local area, or a personal area. Such networks may be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

Devices in a wireless network may transmit/receive information between each other. The information may include packets, which in some aspects may be referred to as data units or data frames. The packets may include overhead information (e.g., header information, packet properties, etc.) that helps in routing the packet through the network, identifying the data in the packet, processing the packet, etc., as well as data, for example user data, multimedia content, etc. as might be carried in a payload of the packet.

The devices may also broadcast a beacon signal to other nodes to help the nodes synchronize timing or to provide other information or functionality. Beacons may therefore convey a large amount of data, some of which may be used by a given node. Accordingly, transmission of data in such beacons may be inefficient due to the fact that much of the bandwidth for transmitting beacons may be used to transmit data that may not be used. Thus, improved systems, methods, and devices for communicating packets are desired.

SUMMARY

The systems, methods, devices, and computer program products discussed herein each have several aspects, no single one of which is solely responsible for its desirable attributes. Without limiting the scope of this invention as expressed by the claims which follow, some features are discussed briefly below. After considering this discussion, and particularly after reading the section entitled "Detailed Description," it may be understood how advantageous features of this invention include reduced power consumption when introducing devices on a medium.

One aspect of the subject matter described in the disclosure provides a method of communicating in a wireless neighborhood aware network (NAN). The method includes determining a discovery period. The method further includes generating a discovery window information element indicating a start time of a discovery window. The method further includes generating a NAN beacon or other sync frame comprising the discovery period and the discovery window information element. The method further includes transmitting, at a wireless device, the NAN beacon or other sync frame during the discovery window.

Another aspect of the subject matter described in the disclosure provides a wireless device configured to communicate in a wireless neighborhood aware network (NAN). The wireless device comprises a processor configured to determine a discovery period. The processor is further configured to generate a discovery window information element indicating a start time of a discovery window. The processor is further configured to generate a NAN beacon or other sync frame comprising the discovery period and the discovery window information element. The processor is further configured to transmit, at a wireless device, the NAN beacon or other sync frame during the discovery window.

Another aspect of the subject matter described in the disclosure provides an apparatus for communicating in a wireless neighborhood aware network (NAN). The apparatus includes means for determining a discovery period. The apparatus further includes means for generating a discovery window information element indicating a start time of a discovery window. The apparatus further includes means for generating a NAN beacon or other sync frame comprising the discovery period and the discovery window information element. The apparatus further includes means for transmitting, at a wireless device, the NAN beacon or other sync frame during the discovery window.

Another aspect of the subject matter described in the disclosure provides a non-transitory computer-readable medium. The medium comprises code that, when executed, causes an apparatus to determine a discovery period. The medium further comprises code that, when executed, causes an apparatus to generate a discovery window information element indicating a start time of a discovery window. The medium further comprises code that, when executed, causes an apparatus to generate a NAN beacon or other sync frame comprising the discovery period and the discovery window information element. The medium further comprises code that, when executed, causes an apparatus to transmit, at a wireless device, the NAN beacon or other sync frame during the discovery window.

DETAILED DESCRIPTION

Figure 1:
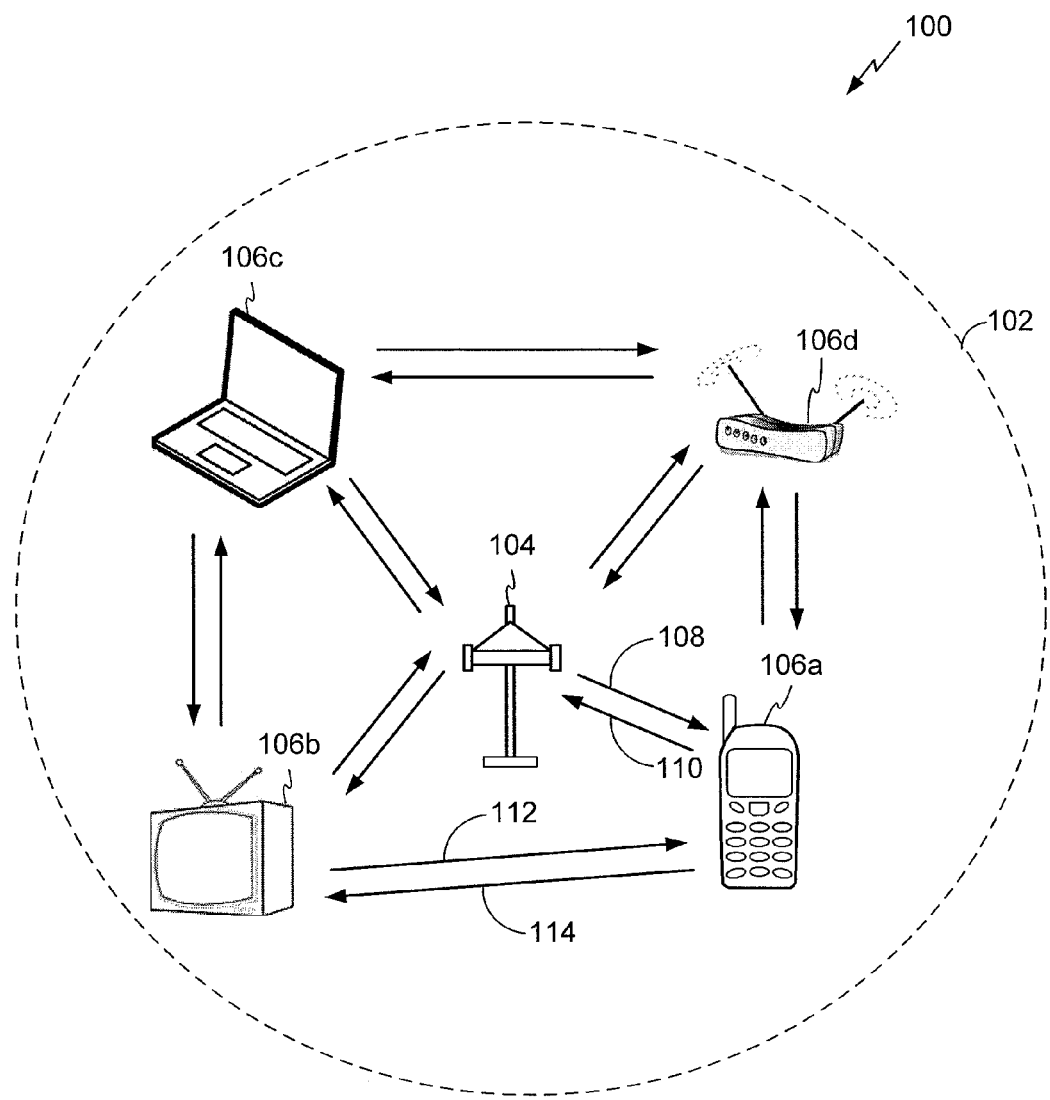
FIG. 1 illustrates an example of a wireless communication system in which aspects of the present disclosure may be employed.

The word "exemplary" is used herein to mean "serving as an example, instance, or illustration." Any embodiment described herein as "exemplary" is not necessarily to be construed as preferred or advantageous over other embodiments. Various aspects of the novel systems, apparatuses, and methods are described more fully hereinafter with reference to the accompanying drawings. This disclosure may, however, be embodied in many different forms and may not be construed as limited to any specific structure or function presented throughout this disclosure. Rather, these aspects are provided so that this disclosure may be thorough and complete, and may fully convey the scope of the disclosure to those skilled in the art. The scope of the disclosure covers any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention covers such an apparatus or method which is practiced using other structure, functionality, or structure and functionality in addition to or other than the various aspects of the invention set forth herein. Any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not limited to particular benefits, uses, or objectives. Rather, aspects of the disclosure are broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some implementations, a WLAN includes various devices which are the components that access the wireless network. For example, there may be two types of devices: access points ("APs") and clients (also referred to as stations, or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a WiFi (e.g., IEEE 802.11 protocol) compliant wireless link to obtain general connectivity to the Internet or to other wide area networks. In some implementations a STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device or wireless device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

Devices, such as a group of stations, for example, may be used for neighborhood aware networking (NAN), or social-WiFi networking. For example, various stations within the network may communicate on a device to device (e.g., peer-to-peer communications) basis with one another regarding applications that each of the stations supports. It is desirable for a discovery protocol used in a social-WiFi network to enable STAs to advertise themselves (e.g., by sending discovery packets) as well as discover services provided by other STAs (e.g., by sending paging or query packets), while ensuring secure communication and low power consumption. A discovery packet may also be referred to as a discovery message or a discovery frame. A paging or query packet may also be referred to as a paging or query message or a paging or query frame.

FIG. 1 illustrates an example of a wireless communication system 100 in which aspects of the present disclosure may be employed. The wireless communication system 100 may operate pursuant to a wireless standard, such as an 802.11 standard. The wireless communication system 100 may include an AP 104, which communicates with STAs 106. In some aspects, the wireless communication system 100 may include more than one AP. Additionally, the STAs 106 may communicate with other STAs 106. As an example, a first STA 106a may communicate with a second STA 106b. As another example, a first STA 106a may communicate with a third STA 106c although this communication link is not illustrated in FIG. 1.

A variety of processes and methods may be used for transmissions in the wireless communication system 100 between the AP 104 and the STAs 106 and between an individual STA, such as the first STA 106a, and another individual STA, such as the second STA 106b. For example, signals may be sent and received in accordance with OFDM/OFDMA techniques. If this is the case, the wireless communication system 100 may be referred to as an OFDM/OFDMA system. Alternatively, signals may be sent and received between the AP 104 and the STAs 106 and between an individual STA, such as the first STA 106a, and another individual STA, such as the second STA 106b, in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

A communication link may be established between STAs, such as during social-WiFi networking. Some possible communication links between STAs are illustrated in FIG. 1. As an example, a communication link 112 may facilitate transmission from the first STA 106a to the second STA 106b. Another communication link 114 may facilitate transmission from the second STA 106b to the first STA 106a.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). The wireless communication system 100 may not have a central AP 104, but rather may function as a peer-to-peer network between the STAs 106. Accordingly, the functions of the AP 104 described herein may alternatively be performed by one or more of the STAs 106.

Figure 2:
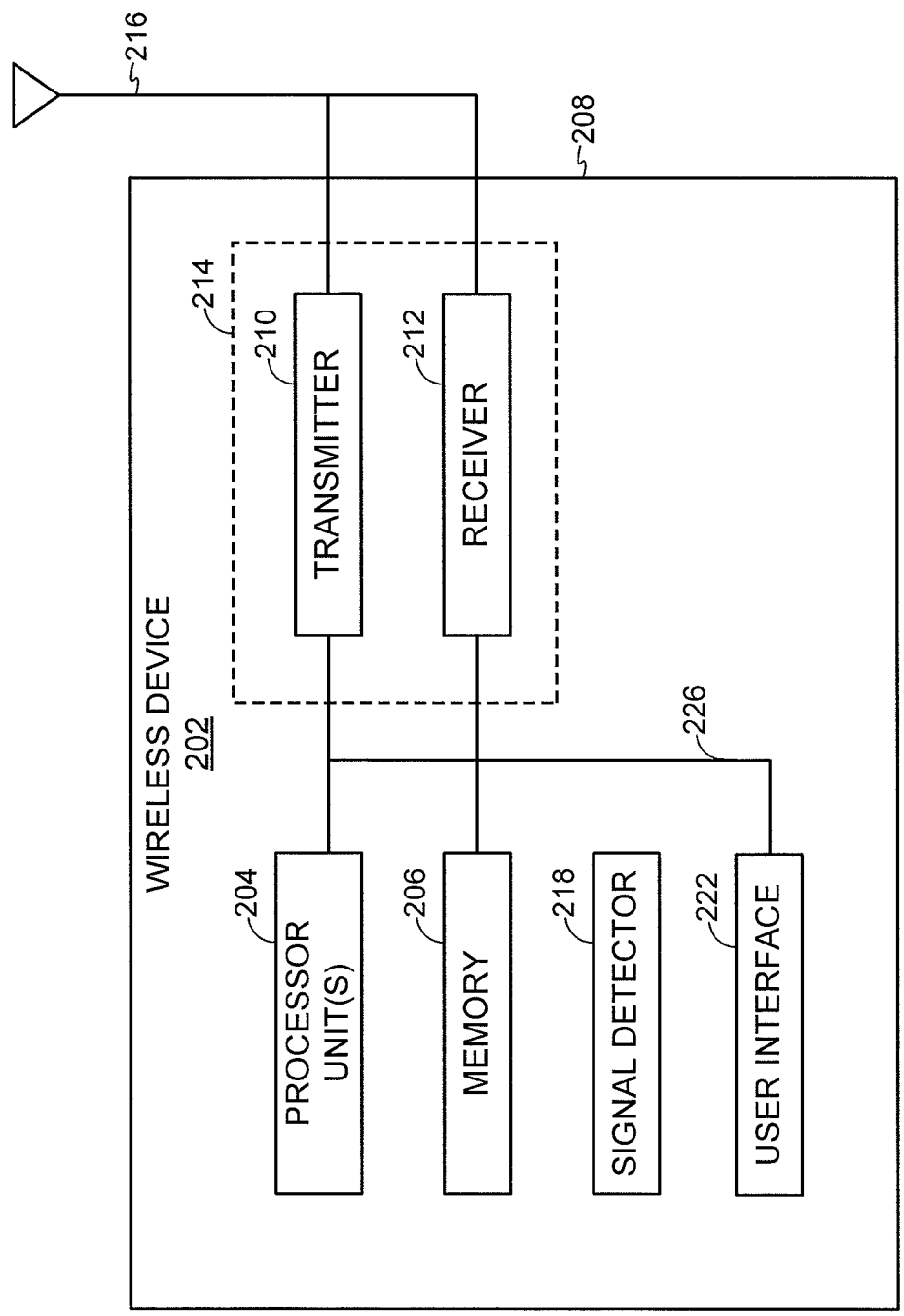
FIG. 2 illustrates a functional block diagram of a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 may perform logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit packets having different packet types or functions. For example, the transmitter 210 may be configured to transmit packets of different types generated by the processor 204. When the wireless device 202 is implemented or used as an AP 104 or STA 106, the processor 204 may be configured to process packets of a plurality of different packet types. For example, the processor 204 may be configured to determine the type of packet and to process the packet and/or fields of the packet accordingly. When the wireless device 202 is implemented or used as an AP 104, the processor 204 may also be configured to select and generate one of a plurality of packet types. For example, the processor 204 may be configured to generate a discovery packet comprising a discovery message and to determine what type of packet information to use in a particular instance.

The receiver 212 may be configured to wirelessly receive packets having different packet types. In some aspects, the receiver 212 may be configured to detect a type of a packet used and to process the packet accordingly.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. The components of the wireless device 202 may be coupled together or accept or provide inputs to each other using some other mechanism.

Although a number of separate components are illustrated in FIG. 2, one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

To ensure proper communication between devices such as AP 104 and the STAs 106 or between multiple STAs 106, the AP 104 or STAs 106 may receive information regarding characteristics of the AP 104 or STAs 106. For example, the STA 106 may use timing information about the AP 104 in order to synchronize timing of communication between the STA 106 and the AP 104. Additionally or alternatively, the STA 106 may require other information such as a medium access control (MAC) address of the AP 104 or another STA, an identifier of the basic service set (BSS) served by the AP 104, etc. The STA 106 may determine whether it needs such information independently, such as through software that is executed using memory 206 and processor 204.

The AP 104 or STA 106 may have a plurality of operational modes. For example, the STA 106 may have a first operational mode referred to as an active mode, normal operation mode, or full power mode. In the active mode, the STA 106 may be in an "awake" state and actively transmit/receive data with another STA 106. Further, the STA 106 may have a second operational mode referred to as a power-save mode or sleep mode. In the power-save mode, the STA 106 may be in the "awake" state or may be in a "doze" or "sleep" state where the STA 106 does not actively transmit/receive data with another STA 106. For example, the receiver 212 and possibly DSP 220 and signal detector 218 of the STA 106 may operate using reduced power consumption in the doze state. Further, in the power-save mode, a STA 106 may occasionally enter the awake state to listen to messages from an AP 104 or from other STAs (e.g., paging messages) that indicate to the STA 106 whether or not the STA 106 needs to "wake up" (e.g., enter the awake state) at a certain time so as to be able to transmit/receive data with the AP 104 or another STA.

Figure 3:
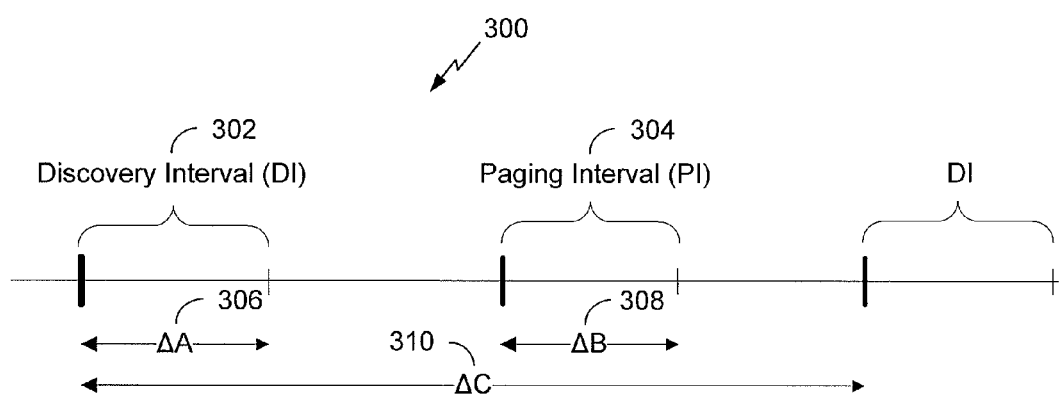
FIG. 3 illustrates an exemplary communication timeline in a wireless communication system in accordance with aspects of the present disclosure.

FIG. 3 illustrates an exemplary communication timeline 300 in a wireless communication system where devices may communicate via one channel. The exemplary communication timeline 300 may include a discovery interval (DI) 302 of a time duration $\Delta A$ 306, a paging interval (PI) 304 of a time duration $\Delta B$ 308, and an overall interval of a time duration $\Delta C$ 310. In some aspects, communications may occur via other channels as well. Time increases horizontally across the page over the time axis.

During the DI 302, APs or STAs may advertise services through broadcast messages such as discovery packets. In some embodiments, the DI 302 may be referred to as a discovery window (DW). APs or STAs may listen to broadcast messages transmitted by other APs or STAs. In some aspects, the duration of DIs may vary over time. In other aspects, the duration of the DI may remain fixed over a period of time. The end of the DI 302 may be separated from the beginning of the subsequent PI 304 by a first remainder period of time as illustrated in FIG. 3. The end of the PI 304 may be separated from the beginning of a subsequent DI by a different remainder period of time as illustrated in FIG. 3.

During the PI 304, APs or STAs may indicate interest in one or more of a plurality of services advertised in a broadcast message by transmitting paging request messages such as paging request packets. APs or STAs may listen to paging request messages transmitted by other APs or STAs. In some aspects, the duration of the PI may vary over time. In other aspects, the duration of the PI may remain constant over a period of time. In some aspects, the duration of the PI may be less than the duration of the DI.

The overall interval of duration $\Delta C$ 310 may measure the period of time from the beginning of one DI to the beginning of a subsequent DI as illustrated in FIG. 3. In some embodiments, the duration $\Delta C$ 310 may be referred to as a discovery period (DP). In some aspects, the duration of the overall interval may vary over time. In other aspects, the duration of the overall interval may remain constant over a period of time. At the conclusion of the overall interval of duration $\Delta C$ 310, another overall interval may begin, including a DI, a PI, and the remainder intervals. Consecutive overall intervals may follow indefinitely or continue for a fixed period of time.

A STA may enter a sleep or power-save mode when the STA is not transmitting or listening or is not expecting to transmit or listen. As an example, the STA may sleep during periods other than the DI or PI. The STA in the sleep mode or power-save mode may awake or return to normal operation or full power mode at the beginning of the DI or PI to enable transmission or listening by the STA. In some aspects, the STA may awake or return to normal operation or full power mode at other times when the STA expects to communicate with another device, or as a result of receiving a notification packet instructing the STA to awake. The STA may awake early to ensure that the STA receives a transmission.

As described above, during the DI, APs or STAs may transmit discovery packets (DPs). During the PI, APs or STAs may transmit paging request packets (PRs). A DP may be a packet configured to advertise a plurality of services provided by a STA or AP and to indicate when the paging interval is for the device that transmits the discovery packet. The DP may include a data frame, management frame, or management action frame. The DP may carry information generated by a higher layer discovery protocol or an application based discovery protocol. The PR may be a packet configured to indicate interest in at least one of the plurality of services provided by an AP or STA.

The start and end of the DI and PI may be known via numerous methods to each STA desiring to transmit a discovery packet or a paging request packet. In some aspects, each STA may synchronize its clock with the other APs or STAs and set a shared DI and PI start time and DI duration and PI duration. In other aspects, a device may send a signal such as a special clear to send (S-CTS) signal to clear the medium of legacy communications, such as communications that may conflict or not be compliant with aspects of the present disclosure, and indicate the beginning and duration of the DI or PI period, as well as additional information about the DI and PI durations.

A STA potentially interested in services advertised via discovery packets, such as from other STAs, may awake or remain awake during the DI and process discovery packets to determine if a particular discovery packet includes information about one or more of a plurality of services that may be of interest to the receiving STA. After the DI period, STAs not planning to communicate information may enter a sleep or power-save mode for a break period until the next time the STAs plan to communicate. In some aspects, a STA may enter the sleep or power-save mode until the STA may communicate additional information with another device outside of the DI or PI. In some aspects, the STA may enter the sleep or power-save mode until the beginning of the next PI. At the beginning of the PI, the interested STA may awake to transmit a paging request packet to the provider of the service.

A STA waiting for a response to a transmitted discovery packet, such as discovery packets transmitted to other STAs, may awake or remain awake during the PI and process paging request packets to determine if a particular paging request packet indicates interest by another device in at least one of plurality of services provided by the STA. After the PI period, STAs not planning to communicate information may enter a sleep or power-save mode for a break period until the next time the STAs plan to communicate. In some aspects, a STA may enter the sleep or power-save mode until the STA may communicate additional information with another device outside of the DI or PI. In some aspects, the STA may enter the sleep or power-save mode until the beginning of the next DI.

As examples, the duration $\Delta C$ of the overall interval may equal approximately one to five seconds in some aspects. In other aspects, the overall interval may be less than one second or more than five seconds. The duration $\Delta A$ of the DI may equal approximately 16 ms in some aspects while more or less than 16 ms in other aspects. The duration $\Delta B$ of the PI may equal approximately the duration $\Delta A$ in some aspects. In other aspects, the duration $\Delta B$ may be more or less than the duration $\Delta A$.

Figure 4:
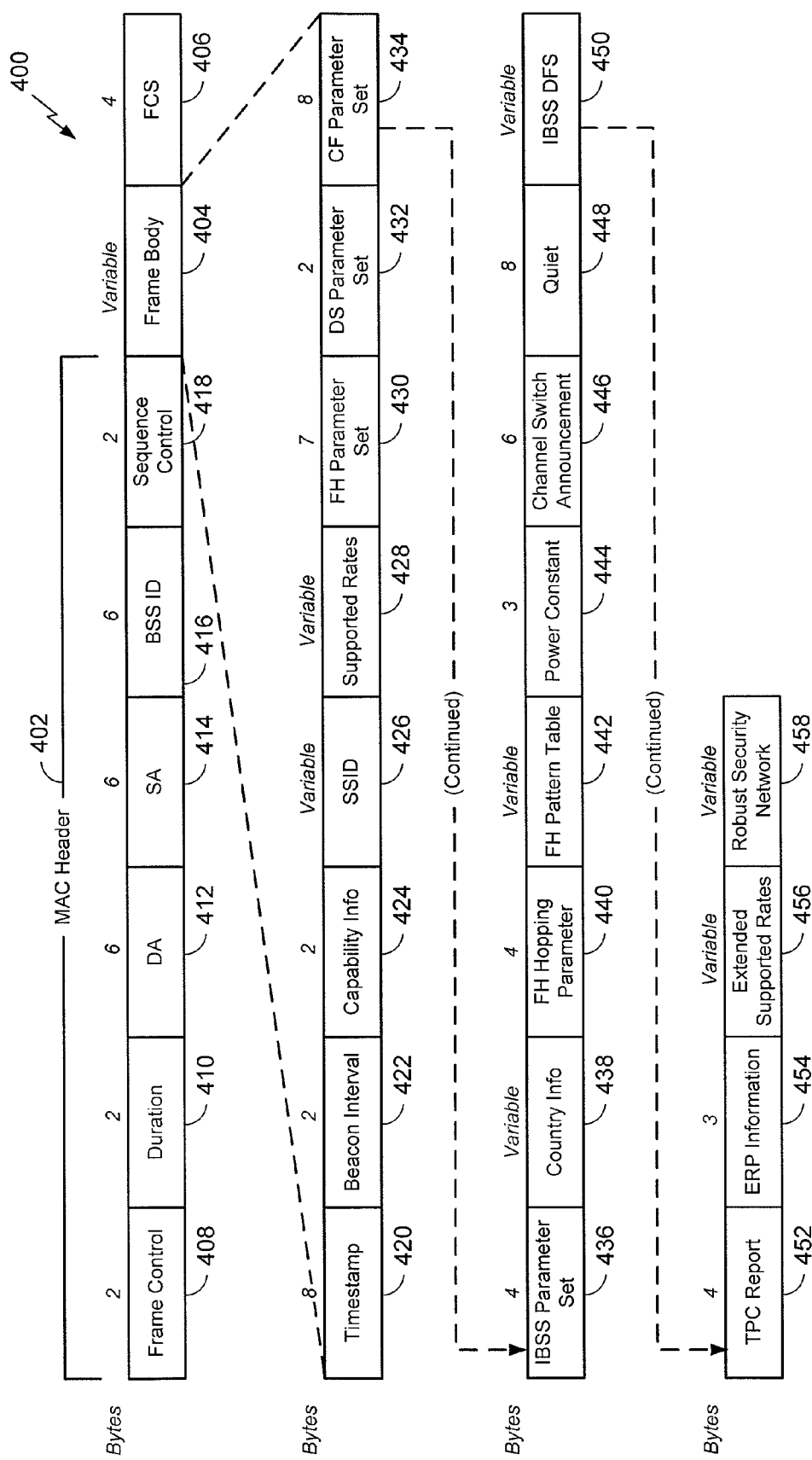
FIG. 4 illustrates an example of a beacon frame used in legacy systems for communication.

FIG. 4 illustrates an example of a beacon frame 400 used in legacy systems for communication. As shown, the beacon 400 includes a median access control (MAC) header 402, a frame body 404, and a frame control sequence (FCS) 406. As shown, the MAC header 402 is 24 bytes long, the frame body 404 is of variable length, and the FCS 406 is four bytes long.

The MAC header 402 serves to provide basic routing information for the beacon frame 400. In the illustrated embodiment, the MAC header 402 includes a frame control (FC) field 408, a duration field 410, a destination address (DA) field 412, a source address (SA) field 414, a basic service set identification (BSSID) field 416, and a sequence control field 418. As shown, the FC field 408 is two bytes long, the duration field 410 is two bytes long, the DA field 412 is six bytes long, the SA field 414 is six bytes long, the BSSID field 416 is six bytes long, and the sequence control field 418 is two bytes long.

The frame body 404 serves to provide detailed information about the transmitting node. In the illustrated embodiment, the frame body 404 includes a timestamp field 420, a beacon interval field 422, a capability information field 424, a service set identifier (SSID) field 426, a supported rates field 428, a frequency-hopping (FH) parameter set 430, a direct-sequence parameter set 432, a contention-free parameter set 434, an independent basic service set (IBSS) parameter set 436, a country information field 438, a FH hopping parameter field 440, a FH pattern table 442, a power constraint field 444, a channel switch announcement field 446, a quiet field 448, a IBSS direct frequency selection (DFS) field 450, a transmit power control (TPC) field 452, an effective radiated power (ERP) information field 454, an extended supported rates field 456, and a robust security network (RSN) field 458.

As shown in FIG. 4, the timestamp field 420 is eight bytes long, the beacon interval field 422 is two bytes long, the capability information field 424 is two bytes long, the service set identifier (SSID) field 426 is a variable length, the supported rates field 428 is a variable length, the frequency-hopping (FH) parameter set 430 is seven bytes long, the direct-sequence parameter set 432 is two bytes long, the contention-free parameter set 434 is eight bytes long, an independent basic service set (IBSS) parameter set 436 is 4 bytes long, the country information field 438 is a variable length, the FH hopping parameter field 440 is four bytes long, the FH pattern table 442 is a variable length, the power constraint field 444 is three bytes long, the channel switch announcement field 446 is six bytes long, the quiet field 448 is eight bytes long, the IBSS direct frequency selection (DFS) field 450 is a variable length, the transmit power control (TPC) field 452 is four bytes long, an effective radiated power (ERP) information field 454 is three bytes long, an extended supported rates field 456 is a variable length, and the robust security network (RSN) field 458 is a variable length.

Referring still to FIG. 4, although the beacon frame 400 is a variable length, it may be at least 89 bytes long. In various radio environments, much of the information contained in the beacon frame 400 may be used infrequently or not at all. Accordingly, in low-power radio environments, it may be desirable to reduce the length of the beacon frame 400 in order to reduce power consumption. Moreover, some radio environments use low data rates. For example an access point implementing an 802.11 ah standard may take a relatively long time to transmit the beacon frame 400 due to relatively slow data transmission rates. Accordingly, it may be desirable to reduce the length of the beacon frame 400 in order to shorten the amount of time it takes to transmit the beacon frame 400.

In various embodiments, neighborhood aware networks may use a synchronization beacon formatted to be compatible with existing hardware configured to decode the beacon frame 400. For example, one or more STAs and/or APs in a neighborhood aware network may transmit a NAN beacon frame, which may be used to maintain synchronization across STAs in the NAN. In some embodiments, various fields in the beacon frame 400 may be removed, resized, and/or repurposed.

Figure 5:
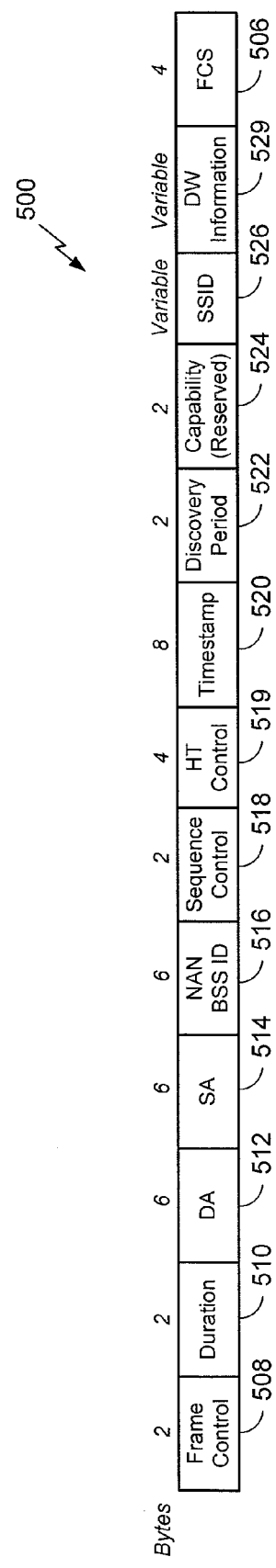
FIG. 5 illustrates an example neighborhood aware network beacon frame.

FIG. 5 illustrates an example neighborhood aware network beacon frame 500. In the illustrated embodiment, the NAN beacon frame 500 includes a frame control (FC) field 508, a duration field 510, a destination address (DA) field 512, a source address (SA) field 514, a NAN BSSID field 516, a sequence control field 518, a high-throughput (HT) control field 519, a timestamp 520, a discovery period field 522, a reserved capability field 524, an SSID field 526, a discovery window (DW) information field 529, and a frame check sequence (FCS) 506. As shown, the frame control (FC) field 508 is 2 bytes long, the duration field 510 is 2 bytes long, the destination address (DA) field 512 is 6 bytes long, the source address (SA) field 514 is 6 bytes long, the NAN BSSID field 516 is 6 bytes long, the sequence control field 518 is 2 bytes long, the high-throughput (HT) control field 519 is 4 bytes long, the timestamp 520 is 8 bytes long, the discovery period field 522 is 2 bytes long, the reserved capability field 524 is 2 bytes long, an SSID field 526 a variable length, the discovery window (DW) information field 529 is a variable length, and the frame check sequence (FCS) 506 is 4 bytes long. In various embodiments, the NAN beacon frame 500 may omit one or more fields shown in FIG. 5 and/or include one or more fields not shown in FIG. 5, including any of the fields discussed herein. The fields in the NAN beacon frame 500 may be of different suitable lengths, and may be in a different order.

In various embodiments, one or more of the frame control (FC) field 508, the duration field 510, the destination address (DA) field 512, the source address (SA) field 514, the sequence control field 518, the timestamp 520, the SSID field 526, and the frame check sequence (FCS) 506 may include the frame control (FC) field 408, the duration field 410, the destination address (DA) field 412, the source address (SA) field 414, the sequence control field 418, the timestamp 420, the SSID field 426, and the frame check sequence (FCS) 406 described above with respect to FIG. 4, respectively. Accordingly, the frame control (FC) field 508, the duration field 510, the destination address (DA) field 512, the source address (SA) field 514, the NAN BSSID field 516, and the sequence control field 518 may be configured to have the same format as a legacy MAC header, such as the MAC header 402 of FIG. 4. The NAN beacon frame 500 may be formatted for processing by legacy hardware, without modification.

In some embodiments, the NAN BSSID field 516 may have the same format as the BSSID field 416 described above with respect to FIG. 4, but may be interpreted differently. In one embodiment, the NAN BSSID 516 may include a predetermined or token BSSID, used in all NAN synchronization frames. Accordingly, different networks may include the same NAN BSSID in synchronization frames. The token BSSID may be preset, universally known, and/or dynamically determined. In some embodiments, the DA field 512 may be set to a broadcast address, and the SA field 514 may be set to a sender address.

In another embodiment, each NAN may have a different (for example, pseudorandom) NAN BSSID 516. In an embodiment, the NAN BSSID 516 may be based on a service application. For example, a NAN created by Application A may have a BSSID 516 based on an identifier of Application A. In some embodiments, the NAN BSSID 516 may be defined by a standards-body. In some embodiments, the NAN BSSID 516 may be based on other contextual information and/or device characteristics such as, for example, a device location, a server-assigned ID, etc. In one example, the NAN BSSID 516 may include a hash of the latitude and longitude location of the NAN.

In an embodiment, the frame control field 508 may include a type indicator. The FC 508 type indicator may indicate that the NAN beacon 500 is a management frame. In an embodiment, a STA 106 (FIG. 1) may set the type indicator to a beacon management frame. In some embodiments, one or more fields of the NAN beacon 500 may be sent as a probe response, and the FC 508 type indicator may indicate that the frame is a probe response.

In some embodiments, the timestamp 520 may have the same format as the timestamp 420 described above with respect to FIG. 4, but may be interpreted differently. In an embodiment, the timestamp 520 may include the clock time of a transmitting device, at the time of transmission or at the time of frame compilation. In an embodiment, a STA 106 (FIG. 1) may set the timestamp 520 to an internal clock value.

In some embodiments, the discovery period field 522 may have the same format as the beacon interval field 422 described above with respect to FIG. 4, but may be interpreted differently. In an embodiment, the discovery period field 522 may indicate a length of the discovery period 310 (described above with respect to FIG. 3). For example, the timestamp 520 may indicate when the discovery interval 302 may start with respect to the discovery period 310.

In some embodiments, the reserved capability field 524 may have the same format as the capability information field 424 described above with respect to FIG. 4, but may be include reserved bits. Accordingly, a receiving STA 106 (FIG. 1) may decode the NAN beacon 500 using legacy hardware, but may ignore the value of the reserved capability field 524. In an embodiment, the reserved capability field 524 may include additional information regarding the NAN.

In some embodiments, the SSID field 526 may have the same format as the SSID field 426 described above with respect to FIG. 4, but may be interpreted differently. In an embodiment, the SSID field 426 may carry an application identifier. In an embodiment, the SSID field 426 may be omitted. In an embodiment, the SSID field 426 may include a network identifier.

The discovery window information field 529 may provide information related to the discovery window 302 described above with respect to FIG. 3. In various embodiments, a STA 106 (FIG. 1) may transmit the NAN beacon at any time during the discovery window 302. Accordingly, a receiving device may not be able to determine a start time of the discovery window 302 based on the transmission time of the NAN beacon 500. In an embodiment, the discovery window information field 529 may indicate an offset or start time of the discovery interval 302 (described above with respect to FIG. 3). For example, the timestamp 520 may indicate when the discovery interval 302 may start with respect to the discovery period 310. Accordingly, a receiving STA 106 may determine a wake-up time based on the discovery window information field 529.

In some embodiments, one or more devices that are not NAN-aware may receive the NAN beacon 500. In some configurations, such legacy devices may interpret the NAN beacon 500 as legacy beacons, such as the beacon 400 described above with respect to FIG. 4. For example, a legacy device may receive a plurality of NAN beacons 500, having a plurality of different NAN BSSID fields 516. In some embodiments, the NAN beacon 500 may be configured such that legacy devices may ignore or discard the NAN beacon 500. In other embodiments, the NAN beacon 500 may be configured so as to reduce the number of different NAN BSSID fields 516 visible to the legacy devices.

In an embodiment the DA 512 may be set to a multicast address, or group of addresses, indicating that the beacon 500 is a NAN beacon. The multicast address, or group of addresses, indicating that the beacon 500 is a NAN beacon may be predetermined, stored in a memory 206 (FIG. 2), and/or set by a standards body. NAN-aware devices may be configured to listen to the NAN multicast address, or group of addresses. Legacy devices may be configured to ignore or discard the NAN multicast address, or group of addresses.

In some embodiments, the SA 514 may be set to a different address from the NAN BSSID 516. For example, the SA 514 may be set to an address of a wireless device 202

(FIG. 2). As discussed above, the NAN BSSID 516 may include a predetermined or token BSSID, used in all NAN synchronization frames, an application-based BSSID, etc. Because some legacy devices may assume that beacon frames have identical SA 514 and BSSID 516 values, some legacy devices may discard or ignore the NAN beacon 500 having different values in the SA 514 and BSSID 516 fields.

In other embodiments, the SA 514 may be set to the NAN BSSID 516, independent of an address of the wireless device 202 (FIG. 2). As discussed above, the NAN BSSID 516 may include a predetermined or token BSSID, used in all NAN synchronization frames. Because some legacy devices may track separate BSSID values seen in beacon frames, reducing the number of different NAN BSSID 516 values used may reduce the number of different networks tracked on the legacy devices.

Figure 6:
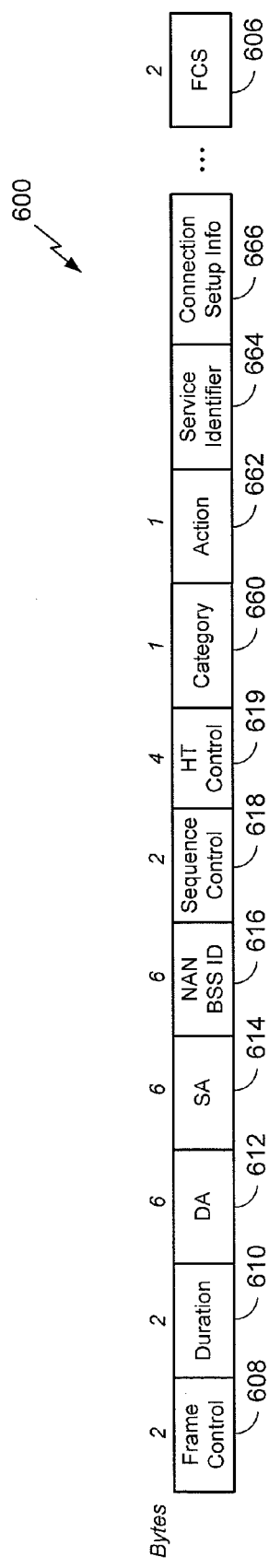
FIG. 6 illustrates an example neighborhood aware network discovery frame.

FIG. 6 illustrates an example neighborhood aware network discovery frame 600. In the illustrated embodiment, the NAN discovery frame 600 includes a frame control (FC) field 608, a duration field 610, a destination address (DA) field 612, a source address (SA) field 614, a NAN BSSID field 616, a sequence control field 618, a high-throughput (HT) control field 619, a category field 660, and action field 662, a service identifier 664, a connection setup information field 666, and a frame check sequence (FCS) 606. As shown, the frame control (FC) field 608 is 2 bytes long, the duration field 610 is 2 bytes long, the destination address (DA) field 612 is 6 bytes long, the source address (SA) field 614 is 6 bytes long, the NAN BSSID field 616 is 6 bytes long, the sequence control field 618 is 2 bytes long, the high-throughput (HT) control field 619 is 4 bytes long, the category field 660 is 1 byte long, the action field 662 is 1 byte long, and the frame check sequence (FCS) 606 is 4 bytes long. In various embodiments, the NAN discovery frame 600 may omit one or more fields shown in FIG. 6 and/or include one or more fields not shown in FIG. 6, including any of the fields discussed herein. The fields in the NAN discovery frame 600 may be of different suitable lengths, and may be in a different order.

In various embodiments, one or more of the frame control (FC) field 608, the duration field 610, the destination address (DA) field 612, the source address (SA) field 614, the sequence control field 618, the timestamp 720, and the frame check sequence (FCS) 606 may include the frame control (FC) field 408, the duration field 410, the destination address (DA) field 412, the source address (SA) field 414, the sequence control field 418, the timestamp 420, and the frame check sequence (FCS) 406 described above with respect to FIG. 4, respectively. Accordingly, the frame control (FC) field 608, the duration field 610, the destination address (DA) field 612, the source address (SA) field 614, the NAN BSSID field 616, and the sequence control field 618 may be configured to have the same format as a legacy MAC header, such as the MAC header 402 of FIG. 4. The NAN discovery frame 600 may be formatted for processing by legacy hardware, without modification.

In some embodiments, the destination address field 612 may have the same format as the destination address field 412 described above with respect to FIG. 4, but may be interpreted differently. In one embodiment, the destination address field 612 may include a predetermined or token BSSID, used in all NAN synchronization frames. The token BSSID may be preset, universally known, and/or dynamically determined. In some embodiments, the destination address field 612 may be set to the same value as the NAN BSSID field 616, described in greater detail below. In some embodiments, certain devices in the network are configured to ignore, drop, or stop decoding packets based on filtering of the destination address field 612. In an embodiment, when the destination address field 612 is set to the NAN BSSID, the devices may be configured to read the entire discovery frame 600. In an embodiment, a device receiving the discovery frame 600 may determine whether it is being addressed based on a requestor address field.

In some embodiments, the NAN BSSID field 616 may have the same format as the BSSID field 416 described above with respect to FIG. 4, but may be interpreted differently. In one embodiment, the NAN BSSID 616 may include a predetermined or token BSSID, used in all NAN synchronization frames. Accordingly, different networks may include the same NAN BSSID in synchronization frames. The token BSSID may be preset, universally known, and/or dynamically determined. In some embodiments, the DA field 612 may be set to a broadcast address, and the SA field 614 may be set to a sender address.

In another embodiment, each NAN may have a different (for example, pseudorandom) NAN BSSID. In an embodiment, the NAN BSSID may be based on a service application. For example, a NAN created by Application A may have a BSSID based on an identifier of Application A. In some embodiments, the NAN BSSID 516 may be defined by a standards-body. In some embodiments, the NAN BSSID 516 may be based on other contextual information and/or device characteristics such as, for example, a device location, a server-assigned ID, etc. In one example, the NAN BSSID 516 may include a hash of the latitude and longitude location of the NAN.

In an embodiment, the frame control field 608 may include a type indicator. The FC 608 type indicator may indicate that the NAN discovery 600 is a management frame. In various embodiments, the NAN discovery frame 600 may be a public action frame. The service identifier 664, connection setup information 666, and/or additional NAN information may be carried as information elements in the public action frame. In an embodiment, a STA 106 (FIG. 1) may set the type indicator to a public action frame.

In an embodiment, the service identifier 664 may indicate service information for the NAN discovery frame 600. In an embodiment, the SA field 614 may include a device identifier of a transmitting device. In an embodiment, the connection setup information field 666 may include information indicating one or more connection parameters such as, for example, use of WiFi direct for connection establishment.

Figure 7:
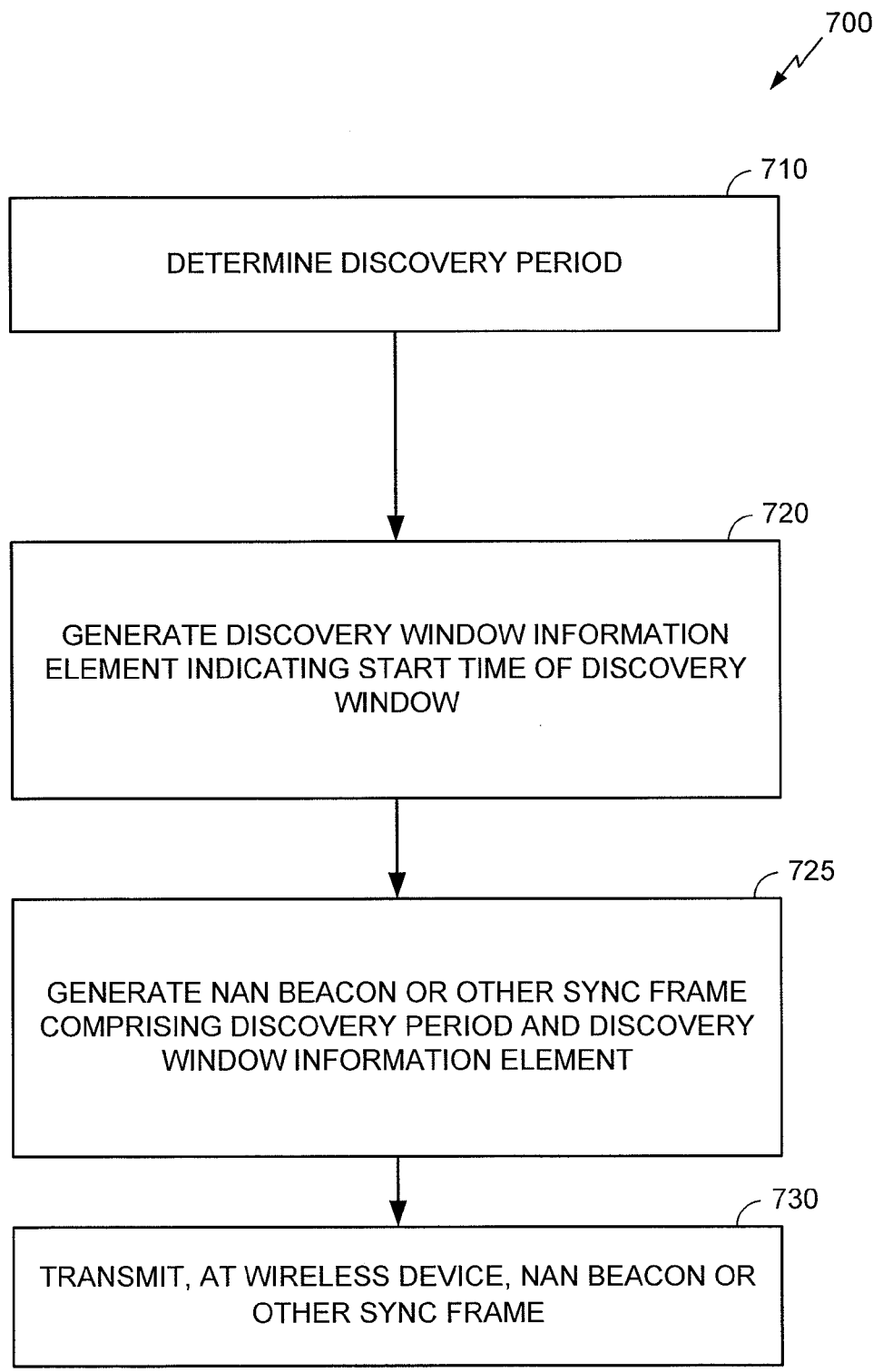
FIG. 7 shows a flowchart for an exemplary method of wireless communication that may be employed within the wireless communication system of FIG. 1.

FIG. 7 shows a flowchart 700 for an exemplary method of wireless communication that may be employed within the wireless communication system 100 of FIG. 1. The method may be implemented in whole or in part by the devices described herein, such as the wireless device 202 shown in FIG. 2. Although the illustrated method is described herein with reference to the wireless communication system 100 discussed above with respect to FIG. 1, and the wireless device 202 discussed above with respect to FIG. 2, the illustrated method may be implemented by another device described herein, or any other suitable device. Although the illustrated method is described herein with reference to a particular order, in various embodiments, blocks herein may be performed in a different order, or omitted, and additional blocks may be added.

First, at block 710, the device 202 determines a discovery period. For example, the STA 106a may determine the discovery period 310 (FIG. 3) for a NAN. In an embodiment, the processor 204 may encode the discovery period 310 in the discovery period field 522 (FIG. 5) of the NAN beacon 500 (FIG. 5).

Next, at block 720, the device 202 generates a discovery window information element indicating a start time of a discovery window. For example, the STA 106a may generate the discovery window information 529 (FIG. 5) based on a start time of the discovery window 302.

Next, at block 725, the device 202 generates a NAN beacon or other sync frame comprising a discovery period and the discovery window information element. As an example, the STA 106a may generate the NAN beacon 500 (FIG. 5) including the NAN BSSID field 516 (FIG. 5). In an embodiment, the processor 204 may encode the start time of the discovery window 302 in the discovery window information field 529 (FIG. 5) of the NAN beacon 500 (FIG. 5). In an embodiment discovery window information includes the start time of the same discovery window 302 in which the NAN beacon 500 is sent.

In some embodiments, the NAN beacon further includes an information element including a time synchronization function (TSF) indicating a time of a subsequent discovery period. For example, the NAN beacon 500 (FIG. 5) may include any of the information elements 800, 900, 1000, and/or 1100, described in further detail below with respect to FIGS. 8-11. In some embodiments, the time synchronization function (TSF) may indicate a time of a current discovery window. The NAN beacon may include the discovery period and the discovery window information. For example, the STA 106a may generate the NAN beacon 500 (FIG. 5) including the discovery period field 522 (FIG. 5) and the discovery window information field 529 (FIG. 5).

In some embodiments, the NAN beacon further includes an information element including a time synchronization function (TSF) indicating a time of a subsequent discovery period. For example, the NAN beacon 500 (FIG. 5) may include any of the information elements 800, 900, 1000, and/or 1100, described in further detail below with respect to FIGS. 8-11. In some embodiments, the time synchronization function (TSF) may indicate a time of a current discovery window.

In some embodiments, the NAN beacon further includes an information element including a transmit address. For example, the NAN beacon 500 (FIG. 5) may include any of the information elements 1000 and 1200, or the attributes 1100 and 1300, described in further detail below with respect to FIGS. 10-13. In some embodiments, the NAN beacon 500 may include an address of the transmitting device when a source address field is set equal to the NAN BSSID.

In some embodiments, the NAN beacon further includes a frame control field, a duration field, a destination address, a source address, the NAN BSSID, a sequence control field, a high throughput control field, a timestamp, a reserved capability field, and a frame check. In various embodiments, the frame control field may be 2 bytes, the duration field may be 2 bytes, the destination address may be 6 bytes, the source address may be 6 bytes, NAN BSSID may be 6 bytes, the sequence control field may be 2 bytes, the high throughput control field may be 4 bytes, the timestamp may be 8 bytes, a discovery period field 2 bytes, the reserved capability field may be 2 reserved bytes, and the frame check may be 4 bytes. For example, the NAN beacon may be the NAN beacon 500 described above with respect to FIG. 5, which may include the frame control (FC) field 508, the duration field 510, the destination address (DA) field 512, the source address (SA) field 514, the NAN BSSID field 516, the sequence control field 518, the high-throughput (HT) control field 519, the timestamp 520, the discovery period field 522, the reserved capability field 524, an SSID field 526, the discovery window (DW) information field 529, and the frame check sequence (FCS) 506.

In an embodiment, the frame control field may include an indication that the NAN beacon is a beacon management frame. In an embodiment, the frame control field may include an indication that the NAN beacon is a probe response. In an embodiment, the destination address may include a broadcast address. In an embodiment, the destination address may include a multicast address, or group of addresses, indicating that the beacon is a NAN beacon.

In an embodiment, the source address is different from the NAN BSSID. For example, the source address may include an address of the wireless device and the NAN BSSID may include at least one of a standards-body-defined BSSID and an application-defined BSSID. In another embodiment, the source address may include the NAN BSSID, independent of an address of the wireless device.

The timestamp may include a clock time of the STA 106a at the time of beacon generation. The NAN beacon may further include an SSID element including at least one of a standards-body-defined SSID and an application-defined SSID.

Thereafter, at block 730, the wireless device 202 transmits the NAN beacon or other sync frame. For example, the STA 106a may transmit the NAN beacon 500 (FIG. 5). In some embodiments, the transmitter 210 may transmit the NAN beacon.

In an embodiment, the method shown in FIG. 7 may be implemented in a wireless device that may include a determining circuit, a generating circuit, and a transmitting circuit. A wireless device may have more components than the simplified wireless device described herein. The wireless device described herein includes those components useful for describing some prominent features of implementations within the scope of the claims.

The determining circuit may be configured to determine the discovery period. The determining circuit may include one or more of the processor 204 (FIG. 2) and the memory 206 (FIG. 2). In some implementations, means for determining may include the determining circuit.

The generating circuit may be configured to generate the discovery window information and the NAN beacon. The generating circuit may include one or more of the processor 204 (FIG. 2) and the memory 206 (FIG. 2). In some implementations, means for generating may include the generating circuit.

The transmitting circuit may be configured to transmit the NAN beacon. The transmitting circuit may include one or more of the transmitter 210 (FIG. 2), the antenna 216 (FIG. 2), and the transceiver 214 (FIG. 2). In some implementations, means for transmitting may include the transmitting circuit.

Figure 8:
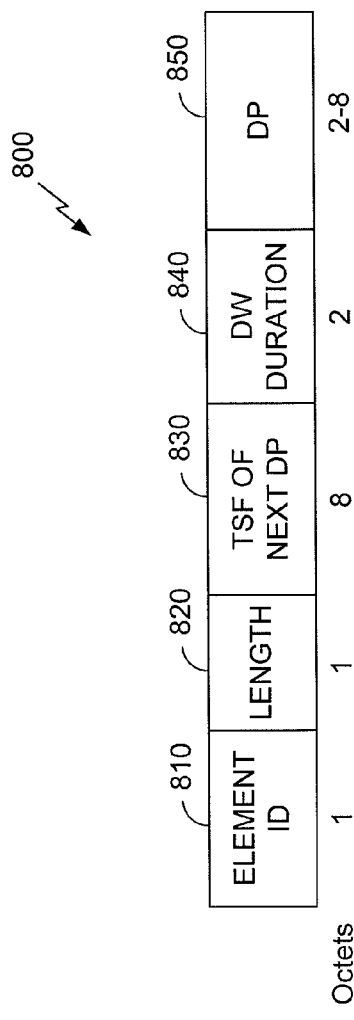
FIG. 8 shows an exemplary information element that may be employed within the wireless communication system of FIG. 1.

FIG. 8 shows an exemplary information element 800 that may be employed within the wireless communication system 100 of FIG. 1. In various embodiments, any device described herein, or another compatible device, may transmit the information element 800 such as, for example, the AP 104 (FIG. 1), a STA 106a-106d (FIG. 1), and/or the wireless device 202 (FIG. 2). One or more messages in the wireless communication system 100 may include the information element 800 such as, for example, the beacon 400 (FIG. 4), the beacon 500 (FIG. 5), the discovery frame 600 (FIG. 6), and/or a probe response. In one embodiment, the information element 800 may include and/or replace the discovery period field 522 and/or the DW information field 529, discussed above with respect to FIG. 5.

In the illustrated embodiment, the information element 800 includes an element identification (ID) field 810, a length field 820, a timing synchronization (TSF) of next discovery period (DP) field 830, a discovery window (DW) duration field 840, and a discovery period (DP) field 850. The information element 800 may include additional fields, and fields may be rearranged, removed, and/or resized.

The element identifier field 810 shown is one octet long. In some implementations, the element identifier field 810 may be two, five, or twelve octets long. In some implementations, the element identifier field 810 may be of variable length, such as varying length from signal to signal and/or as between service providers. The element identifier field 810 may include a value which identifies the element as a discovery information element 800.

The length field 820 may be used to indicate the length of the information element 800 or the total length of subsequent fields. The length field 820 shown in FIG. 8 is one octet long. In some implementations, the length field 820 may be two, five, or twelve octets long. In some implementations, the length field 820 may be of variable length, such as varying length from signal to signal and/or as between service providers.

The TSF of next DP field 830 may indicate a start time of the next DP (for example, the start of the next discovery period 310 described above with respect to FIG. 3). In some embodiments, the start time may be indicated via a timestamp in the format of the timestamp 420 (FIG. 4) and/or 520 (FIG. 5). In various embodiments, the start time may be indicated using an absolute timestamp or a relative timestamp. The TSF of next DP field 830 may indicate the start time of the next DP in ms, μs, time units (TUs), or another unit. In some embodiments, time units may be 1024 μs. The TSF of next DP field 830 shown is eight octets long. In some implementations, TSF of next DP field 830 may be two, five, or twelve octets long.

In some embodiments, the TSF of the current DP may be indicated instead of, or in addition to, the TSF of the next discovery period. In some embodiments, one or more least significant bits of the TSF of the current and/or next DP may be indicated. For example, the two least significant bytes may be indicated. In various embodiments, the three, four, five, six, and seven least significant bytes may be indicated.

The DW duration field 840 may indicate a duration of the DW (for example, the duration of the DI 302 described above with respect to FIG. 3). In various embodiments, the DW duration field 840 may indicate the a duration of the DW in ms, μs, time units (TUs), or another unit. In some embodiments, time units may be 1024 μs. The DW duration field 840 shown is two octets long. In some implementations, DW duration field 840 may be four, six, or eight octets long.

In some embodiments, the discovery period field 850 may have the same format as the discovery period field 522 and/or the beacon interval field 422 described above with respect to FIGS. 5 and 4, respectively. In an embodiment, the discovery period field 850 may indicate a length of the discovery period 310 (described above with respect to FIG. 3). In various embodiments, the discovery period field 850 may indicate the length of the DP 310 in ms, μs, time units (TUs), or another unit. In some embodiments, time units may be 1024 μs. The discovery period field 850 shown is between two and eight octets long. In some implementations, discovery period field 850 may be two, four, six, or eight octets long.

In an embodiment, the discovery period field 850 may be used when another discovery period field is too short to indicate the length of the DP. For example, with reference to FIG. 5, the discovery period field 522 is shown as two bytes long. If the DP comprises a length that may not be represented in two bytes, the discovery period field 522 may be set to a predetermined value (such as zero) indicating that the DP is indicated in another field. For example, the wireless device 202 (FIG. 2) receiving the beacon 500 may be configured to use the discovery period field 850 when the discovery period field 522 is zero.

In some embodiments, the AP 104 may indicate the TSF of the next DP, the DW duration, and the DP in an attribute of an information element, in addition to, or instead of the IE 800. For example, the attribute may be in a vendor-specific IE.

Figure 9:
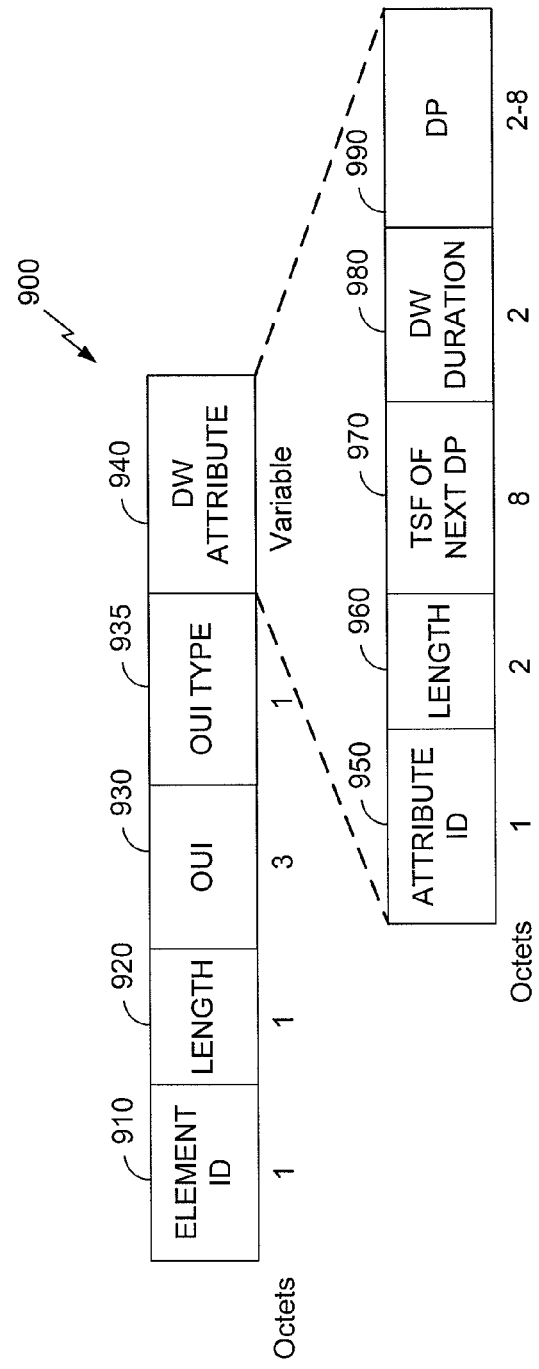
FIG. 9 shows another exemplary information element that may be employed within the wireless communication system of FIG. 1.

FIG. 9 shows another exemplary information element 900 that may be employed within the wireless communication system 100 of FIG. 1. In various embodiments, any device described herein, or another compatible device, may transmit the information element 900 such as, for example, the AP 114 (FIG. 1), a STA 116a-106d (FIG. 1), and/or the wireless device 202 (FIG. 2). One or more messages in the wireless communication system 100 may include the information element 900 such as, for example, the beacon 400 (FIG. 4), the beacon 500 (FIG. 5), the discovery frame 600 (FIG. 6), and/or a probe response. In one embodiment, the information element 900 may include and/or replace the discovery period field 522 and/or the DW information field 529, discussed above with respect to FIG. 5.

In the illustrated embodiment, the information element 900 includes an element identification (ID) field 910, a length field 920, an organizationally unique identifier (OUI) field 930, an OUI type field 935, and a DW attribute field 940. The information element 900 may include additional fields, and fields may be rearranged, removed, and/or resized.

The element identifier field 910 shown is one octet long. In some implementations, the element identifier field 910 may be two, five, or twelve octets long. In some implementations, the element identifier field 910 may be of variable length, such as varying length from signal to signal and/or as between service providers. The element identifier field 910 may include a value which identifies the element as a vendor-specific discovery information element 900.

The length field 920 may be used to indicate the length of the information element 900 or the total length of subsequent fields. The length field 920 shown in FIG. 9 is one octet long. In some implementations, the length field 920 may be two, five, or twelve octets long. In some implementations, the length field 920 may be of variable length, such as varying length from signal to signal and/or as between service providers.

The OUI field 930 may be used to uniquely identify a vendor, manufacturer, or other organization (referred to as an "assignee") globally or worldwide and may effectively reserve a block of each possible type of derivative identifier (such as MAC addresses, group addresses, Subnetwork Access Protocol identifiers, etc.) for the exclusive use of the assignee. The OUI field 930 shown in FIG. 9 is three octets long. In some implementations, the OUI field 930 may be two, five, or twelve octets long. In some implementations, the OUI field 930 may be of variable length, such as varying length from signal to signal and/or as between service providers.

The OUI type field 935 may be used to indicate a type of the OUI field 935 such as, for example, a MAC identifier, a context dependent identifier (CDI), an extended unique identifier (EUI), etc. The OUI type field 935 shown in FIG.

9 is one octet long. In some implementations, the OUI type field 935 may be two, five, or twelve octets long. In some implementations, the OUI type field 935 may be of variable length, such as varying length from signal to signal and/or as between service providers.

The DW attribute 940 may encapsulate an attribute element indicating the TSF of the next DP, the DW duration, and/or the DP. The DW attribute 940 shown in FIG. 9 is of variable length. In some implementations, the DW attribute 940 may be 15 through 21 octets long. The DW attribute 940 includes an attribute ID 950, a length field 960, a TSF of next DP field 970, a DW duration field 980, and a DP field 990. The DW attribute 940 may include additional fields, and fields may be rearranged, removed, and/or resized.

The attribute identifier field 950 shown is one octet long. In some implementations, the attribute identifier field 950 may be two, five, or twelve octets long. In some implementations, the attribute identifier field 950 may be of variable length, such as varying length from signal to signal and/or as between service providers. The attribute identifier field 950 may include a value which identifies the element as a discovery window attribute 940.

The length field 960 may be used to indicate the length of the discovery window attribute 940 or the total length of subsequent fields. The length field 960 shown in FIG. 9 is two octets long. In some implementations, the length field 960 may be one, five, or twelve octets long. In some implementations, the length field 960 may be of variable length, such as varying length from signal to signal and/or as between service providers.

The TSF of next DP field 970 may indicate a start time of the next DP (for example, the start of the next discovery period 310 described above with respect to FIG. 3). In some embodiments, the start time may be indicated via a timestamp in the format of the timestamp 420 (FIG. 4) and/or 520 (FIG. 5). In various embodiments, the start time may be indicated using an absolute timestamp or a relative timestamp. The TSF of next DP field 970 may indicate the start time of the next DP in ms, μs, time units (TUs), or another unit. In some embodiments, time units may be 1024 μs. The TSF of next DP field 970 shown is eight octets long. In some implementations, TSF of next DP field 970 may be two, five, or twelve octets long.

In some embodiments, the TSF of the current DP may be indicated instead of, or in addition to, the TSF of the next discovery period. In some embodiments, one or more least significant bits of the TSF of the current and/or next DP may be indicated. For example, the two least significant bytes may be indicated. In various embodiments, the three, four, five, six, and seven least significant bytes may be indicated.

The DW duration field 980 may indicate a duration of the DW (for example, the duration of the DI 302 described above with respect to FIG. 3). In various embodiments, the DW duration field 980 may indicate the a duration of the DW in ms, time units (TUs), or another unit. In some embodiments, time units may be 1024 μs. The DW duration field 980 shown is two octets long. In some implementations, DW duration field 980 may be four, six, or eight octets long.

In some embodiments, the discovery period field 990 may have the same format as the discovery period field 522 and/or the beacon interval field 422 described above with respect to FIGS. 5 and 4, respectively. In an embodiment, the discovery period field 990 may indicate a length of the discovery period 310 (described above with respect to FIG. 3). In various embodiments, the discovery period field 990 may indicate the length of the DP 310 in ms, μs, time units (TUs), or another unit. In some embodiments, time units may be 1024 μs. The discovery period field 990 shown is between two and eight octets long. In some implementations, discovery period field 990 may be two, four, six, or eight octets long.

In an embodiment, the discovery period field 990 may be used when another discovery period field is too short to indicate the length of the DP. For example, with reference to FIG. 5, the discovery period field 522 is shown as two bytes long. If the DP comprises a length that may not be represented in two bytes, the discovery period field 522 may be set to a predetermined value (such as zero) indicating that the DP is indicated in another field. For example, the wireless device 202 (FIG. 2) receiving the beacon 500 may be configured to use the discovery period field 990 when the discovery period field 522 is zero.

In some embodiments, a transmitting device, such as the AP 104, may further indicate a transmit address. For example, in embodiments where the SA field 514 (FIG. 5) is set to the NAN BSSID 516 (FIG. 5), the transmit address may be conveyed in an information element instead of the SA field 514. More generally, the transmitting device 202 (FIG. 2) may indicate the transmit address in the body of a frame such as, for example, the beacon 500 (FIG. 5), the discovery frame 600 (FIG. 6), or any other frame.

Figure 10:
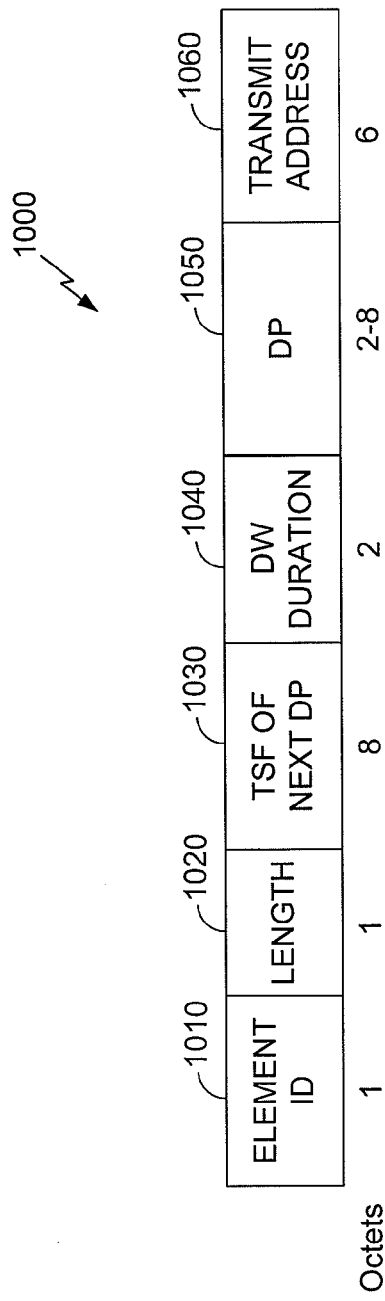
FIG. 10 shows another exemplary information element that may be employed within the wireless communication system of FIG. 1.

FIG. 10 shows another exemplary information element 1000 that may be employed within the wireless communication system 100 of FIG. 1. In various embodiments, any device described herein, or another compatible device, may transmit the information element 1000 such as, for example, the AP 124 (FIG. 1), a STA 126a-106d (FIG. 1), and/or the wireless device 202 (FIG. 2). One or more messages in the wireless communication system 100 may include the information element 1000 such as, for example, the beacon 400 (FIG. 4), the beacon 500 (FIG. 5), the discovery frame 600 (FIG. 6), and/or a probe response. In one embodiment, the information element 1000 may include and/or replace the discovery period field 522 and/or the DW information field 529, discussed above with respect to FIG. 5.

In the illustrated embodiment, the information element 1000 includes an element identification (ID) field 1010, a length field 1020, a timing synchronization (TSF) of next discovery period (DP) field 1030, a discovery window (DW) duration field 1040, and a discovery period (DP) field 1050, and a transmit address 1060. The information element 1000 may include additional fields, and fields may be rearranged, removed, and/or resized.

The element identifier field 1010 shown is one octet long. In some implementations, the element identifier field 1010 may be two, five, or twelve octets long. In some implementations, the element identifier field 1010 may be of variable length, such as varying length from signal to signal and/or as between service providers. The element identifier field 1010 may include a value which identifies the element as a discovery information element 1000.

The length field 1020 may be used to indicate the length of the information element 1000 or the total length of subsequent fields. The length field 1020 shown in FIG. 10 is one octet long. In some implementations, the length field 1020 may be two, five, or twelve octets long. In some implementations, the length field 1020 may be of variable length, such as varying length from signal to signal and/or as between service providers.

The TSF of next DP field 1030 may indicate a start time of the next DP (for example, the start of the next discovery period 310 described above with respect to FIG. 3). In some embodiments, the start time may be indicated via a timestamp in the format of the timestamp 420 (FIG. 4) and/or 520 (FIG. 5). In various embodiments, the start time may be indicated using an absolute timestamp or a relative timestamp. The TSF of next DP field 1030 may indicate the start time of the next DP in ms, µs, time units (TUs), or another unit. In some embodiments, time units may be 1024 µs. The TSF of next DP field 1030 shown is eight octets long. In some implementations, TSF of next DP field 1030 may be two, five, or twelve octets long.

In some embodiments, the TSF of the current DP may be indicated instead of, or in addition to, the TSF of the next discovery period. In some embodiments, one or more least significant bits of the TSF of the current and/or next DP may be indicated. For example, the two least significant bytes may be indicated. In various embodiments, the three, four, five, six, and seven least significant bytes may be indicated.

The DW duration field 1040 may indicate a duration of the DW (for example, the duration of the DI 302 described above with respect to FIG. 3). In various embodiments, the DW duration field 1040 may indicate the a duration of the DW in ms, µs, time units (TUs), or another unit. In some embodiments, time units may be 1024 µs. The DW duration field 1040 shown is two octets long. In some implementations, DW duration field 1040 may be four, six, or eight octets long.

In some embodiments, the discovery period field 1050 may have the same format as the discovery period field 522 and/or the beacon interval field 422 described above with respect to FIGS. 5 and 4, respectively. In an embodiment, the discovery period field 1050 may indicate a length of the discovery period 310 (described above with respect to FIG. 3). In various embodiments, the discovery period field 1050 may indicate the length of the DP 310 in ms, µs, time units (TUs), or another unit. In some embodiments, time units may be 1024 µs. The discovery period field 1050 shown is between two and eight octets long. In some implementations, discovery period field 1050 may be two, four, six, or eight octets long.

In an embodiment, the discovery period field 1050 may be used when another discovery period field is too short to indicate the length of the DP. For example, with reference to FIG. 5, the discovery period field 522 is shown as two bytes long. If the DP comprises a length that may not be represented in two bytes, the discovery period field 522 may be set to a predetermined value (such as zero) indicating that the DP is indicated in another field. For example, the wireless device 202 (FIG. 2) receiving the beacon 500 may be configured to use the discovery period field 1050 when the discovery period field 522 is zero.

The transmit address field 1060 may indicate an address (such as a MAC address) of a device transmitting the IE 1000. In some embodiments, the transmit address field 1060 may have the same format as the SA field 412 (FIG. 4), 512 (FIG. 5), and/or 612 (FIG. 6). The transmit address field 1060 shown is six octets long. In some implementations, transmit address field 1060 may be four, five, or eight octets long.

In some embodiments, the AP 104 may indicate the TSF of the next DP, the DW duration, the DP, and/or the transmit address in an attribute of an information element, in addition to, or instead of the IE 1000. For example, the attribute may be in a vendor-specific IE.

Figure 11:
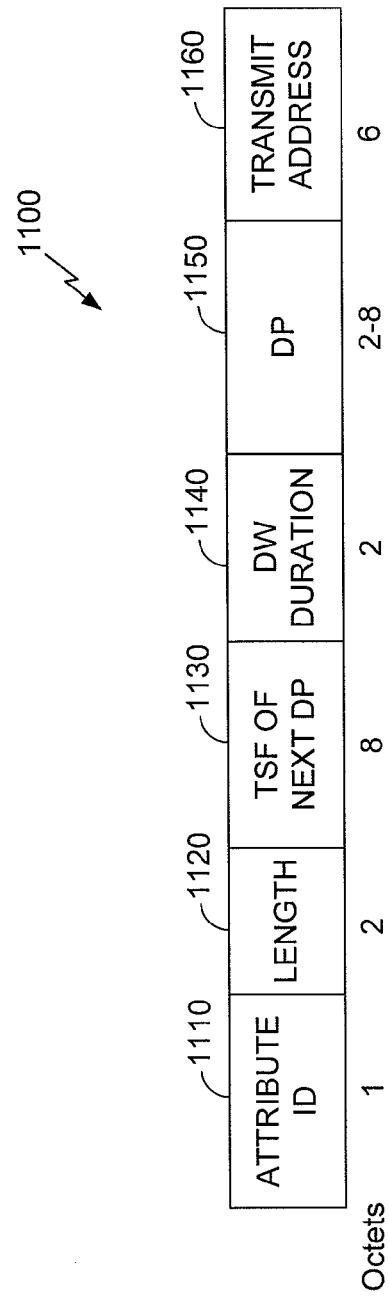
FIG. 11 shows an exemplary discovery window attribute that may be employed within the wireless communication system of FIG. 1.

FIG. 11 shows an exemplary discovery window attribute 1100 that may be employed within the wireless communication system 100 of FIG. 1. In various embodiments, any device described herein, or another compatible device, may transmit the DW attribute 1100 such as, for example, the AP 134 (FIG. 1), a STA 136a-106d (FIG. 1), and/or the wireless device 202 (FIG. 2). One or more messages in the wireless communication system 100 may include the DW attribute 1100 such as, for example, the beacon 400 (FIG. 4), the beacon 500 (FIG. 5), the discovery frame 600 (FIG. 6), and/or a probe response. In one embodiment, the DW attribute 1100 may include and/or replace the DW attribute 940 described above with respect to FIG. 11.

As shown in FIG. 11, the DW attribute 1100 includes an attribute ID 1110, a length field 1120, a TSF of next DP field 1130, a DW duration field 1140, a DP field 1150, and a transmit address 1160. The DW attribute 1100 may include additional fields, and fields may be rearranged, removed, and/or resized.

The attribute identifier field 1110 shown is one octet long. In some implementations, the attribute identifier field 1110 may be two, five, or twelve octets long. In some implementations, the attribute identifier field 1110 may be of variable length, such as varying length from signal to signal and/or as between service providers. The attribute identifier field 1110 may include a value which identifies the element as a discovery window attribute 1140.

The length field 1120 may be used to indicate the length of the discovery window attribute 1140 or the total length of subsequent fields. The length field 1120 shown in FIG. 11 is two octets long. In some implementations, the length field 1120 may be one, five, or twelve octets long. In some implementations, the length field 1120 may be of variable length, such as varying length from signal to signal and/or as between service providers.

The TSF of next DP field 1130 may indicate a start time of the next DP (for example, the start of the next discovery period 310 described above with respect to FIG. 3). In some embodiments, the start time may be indicated via a timestamp in the format of the timestamp 420 (FIG. 4) and/or 520 (FIG. 5). In various embodiments, the start time may be indicated using an absolute timestamp or a relative timestamp. The TSF of next DP field 1130 may indicate the start time of the next DP in ms, µs, time units (TUs), or another unit. In some embodiments, time units may be 1024 µs. The TSF of next DP field 1130 shown is eight octets long. In some implementations, TSF of next DP field 1130 may be two, five, or twelve octets long.

In some embodiments, the TSF of the current DP may be indicated instead of, or in addition to, the TSF of the next discovery period. In some embodiments, one or more least significant bits of the TSF of the current and/or next DP may be indicated. For example, the two least significant bytes may be indicated. In various embodiments, the three, four, five, six, and seven least significant bytes may be indicated.

The DW duration field 1140 may indicate a duration of the DW (for example, the duration of the DI 302 described above with respect to FIG. 3). In various embodiments, the DW duration field 1140 may indicate the a duration of the DW in ms, time units (TUs), or another unit. In some embodiments, time units may be 1024 µs. The DW duration field 1140 shown is two octets long. In some implementations, DW duration field 1140 may be four, six, or eight octets long.

In some embodiments, the discovery period field 1150 may have the same format as the discovery period field 522 and/or the beacon interval field 422 described above with respect to FIGS. 5 and 4, respectively. In an embodiment, the discovery period field 1150 may indicate a length of the discovery period 310 (described above with respect to FIG. 3). In various embodiments, the discovery period field 1150 may indicate the length of the DP 310 in ms, µs, time units (TUs), or another unit. In some embodiments, time units may be 1024 μs. The discovery period field 1150 shown is between two and eight octets long. In some implementations, discovery period field 1150 may be two, four, six, or eight octets long.

In an embodiment, the discovery period field 1150 may be used when another discovery period field is too short to indicate the length of the DP. For example, with reference to FIG. 5, the discovery period field 522 is shown as two bytes long. If the DP comprises a length that may not be represented in two bytes, the discovery period field 522 may be set to a predetermined value (such as zero) indicating that the DP is indicated in another field. For example, the wireless device 202 (FIG. 2) receiving the beacon 500 may be configured to use the discovery period field 1150 when the discovery period field 522 is zero.

The transmit address field 1160 may indicate an address (such as a MAC address) of a device transmitting the IE 1200. In some embodiments, the transmit address field 1160 may have the same format as the SA field 412 (FIG. 4), 512 (FIG. 5), and/or 612 (FIG. 6). The transmit address field 1160 shown is six octets long. In some implementations, transmit address field 1160 may be four, five, or eight octets long.

In some embodiments, the AP 104 (FIG. 1) may indicate the transmit address in an information element that does not include the TSF of the next DP, the DW duration, and/or the DP.

Figure 12:
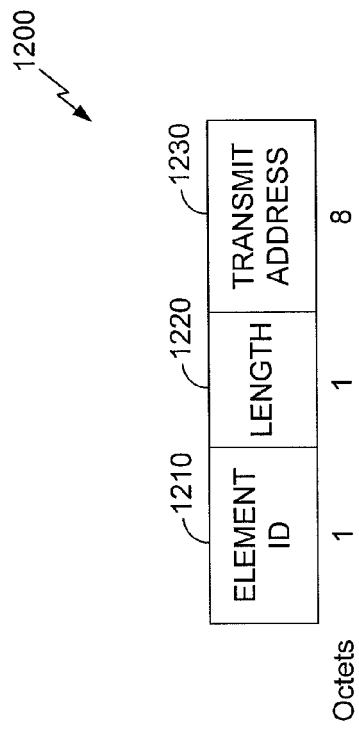
FIG. 12 shows another exemplary information element that may be employed within the wireless communication system of FIG. 1.

FIG. 12 shows another exemplary information element 1200 that may be employed within the wireless communication system 100 of FIG. 1. In various embodiments, any device described herein, or another compatible device, may transmit the information element 1200 such as, for example, the AP 144 (FIG. 1), a STA 146a-106d (FIG. 1), and/or the wireless device 202 (FIG. 2). One or more messages in the wireless communication system 100 may include the information element 1200 such as, for example, the beacon 400 (FIG. 4), the beacon 500 (FIG. 5), the discovery frame 600 (FIG. 6), and/or a probe response.

In the illustrated embodiment, the information element 1200 includes an element identification (ID) field 1210, a length field 1220, and a transmit address 1230. The information element 1200 may include additional fields, and fields may be rearranged, removed, and/or resized.

The element identifier field 1210 shown is one octet long. In some implementations, the element identifier field 1210 may be two, five, or twelve octets long. In some implementations, the element identifier field 1210 may be of variable length, such as varying length from signal to signal and/or as between service providers. The element identifier field 1210 may include a value which identifies the element as a discovery information element 1200.

The length field 1220 may be used to indicate the length of the information element 1200 or the total length of subsequent fields. The length field 1220 shown in FIG. 12 is one octet long. In some implementations, the length field 1220 may be two, five, or twelve octets long. In some implementations, the length field 1220 may be of variable length, such as varying length from signal to signal and/or as between service providers.

The transmit address field 1230 may indicate an address (such as a MAC address) of a device transmitting the IE 1200. In some embodiments, the transmit address field 1230 may have the same format as the SA field 412 (FIG. 4), 512 (FIG. 5), and/or 612 (FIG. 6). The transmit address field 1230 shown is six octets long. In some implementations, transmit address field 1230 may be four, five, or eight octets long.

In some embodiments, the AP 104 (FIG. 1) may indicate the transmit address in an attribute of an information element that does not include the TSF of the next DP, the DW duration, and/or the DP.

Figure 13:
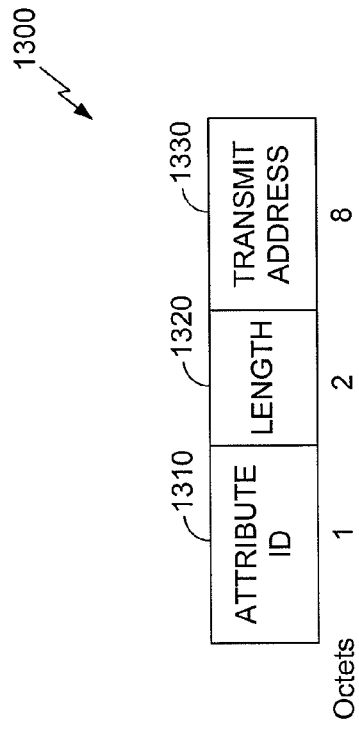
FIG. 13 shows an exemplary transmit address attribute that may be employed within the wireless communication system of FIG. 1.

FIG. 13 shows an exemplary transmit address attribute 1300 that may be employed within the wireless communication system 100 of FIG. 1. In various embodiments, any device described herein, or another compatible device, may transmit the DW attribute 1300 such as, for example, the AP 154 (FIG. 1), a STA 156a-106d (FIG. 1), and/or the wireless device 202 (FIG. 2). One or more messages in the wireless communication system 100 may include the DW attribute 1300 such as, for example, the beacon 400 (FIG. 4), the beacon 500 (FIG. 5), the discovery frame 600 (FIG. 6), and/or a probe response.

As shown in FIG. 13, the DW attribute 1300 includes an attribute ID 1310, a length field 1320, and a transmit address 1330. The DW attribute 1300 may include additional fields, and fields may be rearranged, removed, and/or resized.

The attribute identifier field 1310 shown is one octet long. In some implementations, the attribute identifier field 1310 may be two, five, or twelve octets long. In some implementations, the attribute identifier field 1310 may be of variable length, such as varying length from signal to signal and/or as between service providers. The attribute identifier field 1310 may include a value which identifies the element as a transmit address attribute 1540.

The length field 1320 may be used to indicate the length of the transmit address attribute 1540 or the total length of subsequent fields. The length field 1320 shown in FIG. 13 is two octets long. In some implementations, the length field 1320 may be one, five, or twelve octets long. In some implementations, the length field 1320 may be of variable length, such as varying length from signal to signal and/or as between service providers.

The transmit address field 1330 may indicate an address (such as a MAC address) of a device transmitting the IE 1200. In some embodiments, the transmit address field 1330 may have the same format as the SA field 412 (FIG. 4), 512 (FIG. 5), and/or 612 (FIG. 6). The transmit address field 1330 shown is six octets long. In some implementations, transmit address field 1330 may be four, five, or eight octets long.

As described herein, various fields, devices, and methods are described with respect to a beacon, such as the beacon 500 of FIG. 5. The fields, devices, and methods described herein may also be applied to other sync frames, which may be configured to convey timing information to synchronize NAN devices within a network. For example, a sync frame may include a discovery window information element indicating a start time of a discovery window and a discovery period indicator. In some embodiments, a sync frame having a beacon type may be referred to as a beacon.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element may precede the second element in some manner. Also, unless stated otherwise a set of elements may include one or more elements.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions may not be interpreted as causing a departure from the scope of the present disclosure.

The various illustrative logical blocks, modules, and circuits described in connection with the aspects disclosed herein and in connection with FIGS. 1-13 may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above may also be included within the scope of computer-readable media. Additionally, the operations of a method or algorithm may reside as one or any combination or set of codes and instructions on a machine readable medium and computer-readable medium, which may be incorporated into a computer program product.

Any specific order or hierarchy of steps in any disclosed process is an example of a sample approach. Based upon design preferences, the specific order or hierarchy of steps in the processes may be rearranged while remaining within the scope of the present disclosure. The accompanying method claims present elements of the various steps in a sample order, and are not limited to the specific order or hierarchy presented.

Various modifications to the implementations described in this disclosure may be readily apparent to those skilled in the art, and the generic principles defined herein may be applied to other implementations without departing from the spirit or scope of this disclosure. Thus, the disclosure is not limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this may not require that such operations be performed in the particular order shown or in sequential order, or that all illustrated operations be performed, to achieve desirable results. In certain circumstances, multitasking and parallel processing may be advantageous. Moreover, the separation of various system components in the implementations described above may not require such separation in all implementations and the described program components and systems may generally be integrated together in a single software product or packaged into multiple software products. Additionally, other implementations are within the scope of the following claims. In some cases, the actions recited in the claims may be performed in a different order and still achieve desirable results.

What is claimed is:

1. A method of communicating in a wireless neighborhood aware network (NAN), comprising:
   determining, by a wireless device, a discovery period, the discovery period including a discovery window and indicating a duration of time from a start of the discovery window to a start of a subsequent discovery window;
   generating, by the wireless device, a NAN beacon or other sync frame comprising a discovery period field indicating the discovery period, a field indicating a start time of the discovery window in relation to the discovery period, a destination address field that includes a broadcast address, a network address field that includes a NAN BSSID of the NAN, independent of an address of the wireless device and an information element comprising a time synchronization function (TSF) indicating a time of a subsequent discovery period; and
   transmitting, by the wireless device, the NAN beacon or other sync frame during the discovery window.

2. The method of claim 1, wherein the NAN beacon or other sync frame further comprises an information element comprising a time synchronization function (TSF) indicating a time of a current discovery window.

3. The method of claim 1, wherein the NAN beacon or other sync frame further comprises an information element comprising a transmit address.

4. The method of claim 1, wherein the NAN BSSID comprises a universal BSSID token.

5. The method of claim 1, wherein the NAN BSSID is based on an application identifier.

6. The method of claim 1, wherein the NAN BSSID comprises a pseudo-unique network identifier.

7. The method of claim 1, wherein the NAN beacon or other sync frame further comprises a frame control field comprising an indication that the NAN beacon or other sync frame is a beacon management frame.

8. The method of claim 7, wherein the frame control field further comprises an indication that the NAN beacon or other sync frame is a probe response.

9. The method of claim 1, wherein the destination address field further comprises a multicast address, or a group of addresses, indicating that the beacon is a NAN beacon or other sync frame.

10. The method of claim 1, wherein the destination address is the same as the NAN BSSID.

11. The method of claim 1, wherein the NAN BSSID comprises at least one of a standards-body-defined BSSID or an application-defined BSSID.

12. The method of claim 1, wherein the address of the wireless device is carried in a frame body of the NAN beacon.

13. The method of claim 1, wherein the NAN BSSID is based on a characteristic of the wireless device.

14. The method of claim 1, wherein the NAN beacon or other sync frame further comprises a timestamp comprising a clock time of the wireless device at the time of the generation of the NAN beacon or other sync frame.

15. The method of claim 1, wherein the NAN beacon or other sync frame further comprises an SSID element comprising at least one of a standards-body-defined SSID or an application-defined SSID.

16. A wireless device configured to communicate in a wireless neighborhood aware network (NAN), comprising:
   a processor configured to:
      determine a discovery period, the discovery period including a discovery window and indicating a period of time from a start of the discovery window to a start of a subsequent discovery window;
      generate a NAN beacon or other sync frame comprising a discovery period field indicating the discovery period, a field indicating a start time of the discovery window in relation to the discovery period, a destination address field that includes a broadcast address, a network address field that includes a NAN BSSID of the NAN, independent of the address of the wireless device and an information element comprising a time synchronization function (TSF) indicating a time of a subsequent discovery period; and
      transmit the NAN beacon or other sync frame during the discovery window.

17. The wireless device of claim 16, wherein the NAN beacon or other sync frame further comprises an information element comprising a time synchronization function (TSF) indicating a time of a current discovery window.

18. The wireless device of claim 16, wherein the NAN beacon or other sync frame further comprises an information element comprising a transmit address.

19. The wireless device of claim 16, wherein the NAN BSSID comprises a universal BSSID token.

20. The wireless device of claim 16, wherein the NAN BSSID is based on an application identifier.

21. The wireless device of claim 16, wherein the NAN BSSID comprises a pseudo-unique network identifier.

22. The wireless device of claim 16, wherein the NAN beacon or other sync frame further comprises a frame control field comprising an indication that the NAN beacon or other sync frame is a beacon management frame.

23. The wireless device of claim 22, wherein the frame control field further comprises an indication that the NAN beacon or other sync frame is a probe response.

24. The wireless device of claim 16, wherein the destination address field further comprises a multicast address, or a group of addresses, indicating that the beacon is a NAN beacon or other sync frame.

25. The wireless device of claim 16, wherein the destination address is the same as the NAN BSSID.

26. The wireless device of claim 16, wherein the NAN BSSID comprises at least one of a standards-body-defined BSSID or an application-defined BSSID.

27. The wireless device of claim 16, wherein the address of the wireless device is carried in a frame body of the NAN beacon.

28. The wireless device of claim 16, wherein the NAN BSSID is based on a characteristic of the wireless device.

29. The wireless device of claim 16, wherein the NAN beacon or other sync frame further comprises a timestamp comprising a clock time of the wireless device at the time of the generation of the NAN beacon or other sync frame.

30. The wireless device of claim 16, wherein the NAN beacon or other sync frame further comprises an SSID element comprising at least one of a standards-body-defined SSID or an application-defined SSID.

31. An apparatus for communicating in a wireless neighborhood aware network (NAN), comprising:
   means for determining a discovery period, the discovery period including a discovery window and indicating a period of time from a start of the discovery window to a start of a subsequent discovery window;
   means for generating a NAN beacon or other sync frame comprising a discovery period field indicating the discovery period, a field indicating a start time of the discovery window in relation to the discovery period, a destination address field that includes a broadcast address, a network address field that includes a NAN BSSID of the NAN independent of an address of the apparatus and an information element comprising a time synchronization function (TSF) indicating a time of a subsequent discovery period; and means for transmitting the NAN beacon or other sync frame during the discovery window.

32. A non-transitory computer-readable medium comprising code that, when executed, causes an apparatus configured to communicate in a wireless neighborhood aware network (NAN) to:

determine a discovery period, the discovery period including a discovery window and indicating a period of time from a start of the discovery window to a start of a subsequent discovery window;

generate a NAN beacon or other sync frame comprising a discovery period field indicating the discovery period, a field indicating a start time of the discovery window in relation to the discovery period, a destination address field that includes a broadcast address, a network address field that includes a NAN BSSID of the NAN, independent of an address of the wireless device and an information element comprising a time synchronization function (TSF) indicating a time of a subsequent discovery period; and transmit the NAN beacon or other sync frame during the discovery window.

* * * * *